United States Patent
Ekelund et al.

(10) Patent No.: US 12,090,986 B2
(45) Date of Patent: Sep. 17, 2024

(54) METHOD FOR TURNING OFF AN INTERNAL COMBUSTION ENGINE OF A VEHICLE POWERTRAIN SYSTEM AND A VEHICLE POWERTRAIN SYSTEM

(71) Applicants: Ningbo Geely Automobile Research & Development Co., Ltd., Ningbo (CN); Zhejiang Geely Holding Group Co., Ltd., Zhejiang (CN)

(72) Inventors: Johan Ekelund, Gothenburg (SE); Henok Fessehatsion, Gothenburg (SE)

(73) Assignees: Ningbo Geely Automobile Research & Dev. Co., Ltd., Ningbo (CN); Zhejiang Geely Holding Group Co., Ltd., Zhejigan Zhejigan (CN)

( * ) Notice: Subject to any disclaimer, the term of this patent is extended or adjusted under 35 U.S.C. 154(b) by 28 days.

(21) Appl. No.: 17/985,291

(22) Filed: Nov. 11, 2022

(65) Prior Publication Data

US 2023/0071508 A1    Mar. 9, 2023

Related U.S. Application Data

(63) Continuation of application No. PCT/CN2021/096799, filed on May 28, 2021.

(30) Foreign Application Priority Data

Jun. 12, 2020 (EP) .................................... 20179682

(51) Int. Cl.
*B60W 10/02* (2006.01)
*B60W 10/06* (2006.01)
(Continued)

(52) U.S. Cl.
CPC ............ *B60W 10/02* (2013.01); *B60W 10/06* (2013.01); *B60W 10/113* (2013.01);
(Continued)

(58) Field of Classification Search
CPC .............................. B60W 10/06; B60W 10/02
See application file for complete search history.

(56) References Cited

U.S. PATENT DOCUMENTS

| 2011/0245036 A1 | 10/2011 | Lochocki, Jr. |
| 2012/0010044 A1* | 1/2012 | Gibson ................. B60W 10/06 |
| | | 477/79 |

(Continued)

FOREIGN PATENT DOCUMENTS

| CN | 102211577 A | 10/2011 |
| CN | 102383952 A | 3/2012 |

(Continued)

OTHER PUBLICATIONS

DE102010046138A1 machine translation (Year: 2024).*
International Search Report from International Application No. PCT/CN2021/096799, mailed Aug. 26, 2021, 2 pages.

*Primary Examiner* — Stacey A Fluhart
(74) *Attorney, Agent, or Firm* — Tucker Ellis LLP

(57) ABSTRACT

A method for turning off an internal combustion engine (ICE) where a clutch arrangement has first and second clutches that respectively couple the ICE to first and second input shafts of a transmission. The input shafts are drivingly connected to first and second sets of gears, respectively. The sets of gears are connected to an output shaft of the transmission. The method includes: controlling the ICE in an idling state when the vehicle is in standstill, wherein the clutches are in open positions; engaging the first input shaft with a first pre-selected gear, and engaging the second input shaft with a second pre-selected gear; initiating an engine turning off command; stopping the ICE by at least partly closing the clutches for simultaneously introducing torque transfer to the clutches into a transmission tie-up state for a controlled engine stop, wherein engine inertia of the ICE is captured in the clutches.

20 Claims, 2 Drawing Sheets

(51) Int. Cl.
*B60W 10/113* (2012.01)
*B60W 30/18* (2012.01)

(52) U.S. Cl.
CPC ............... *B60W 30/18027* (2013.01); *B60W 2510/0208* (2013.01); *B60W 2510/0638* (2013.01); *B60W 2510/069* (2013.01)

(56) References Cited

U.S. PATENT DOCUMENTS

| | | | |
|---|---|---|---|
| 2014/0080669 A1* | 3/2014 | Gibson | B60W 10/06 477/115 |
| 2014/0162846 A1* | 6/2014 | Yoon | B60W 10/06 477/175 |
| 2015/0219020 A1 | 8/2015 | Doering | |
| 2017/0259809 A1* | 9/2017 | Sakamoto | B60W 40/105 |
| 2018/0119801 A1* | 5/2018 | Frait | B60W 10/08 |
| 2018/0244169 A1* | 8/2018 | Meyer | B60L 15/2054 |
| 2022/0243806 A1* | 8/2022 | Piracha | F16H 61/0204 |

FOREIGN PATENT DOCUMENTS

| | | | | |
|---|---|---|---|---|
| CN | 102837699 A | | 12/2012 | |
| CN | 109606349 A | | 4/2019 | |
| DE | 102010046138 A1 | * | 3/2012 | ............ B60W 10/02 |
| EP | 1835204 A1 | | 9/2007 | |
| FR | 3056955 A1 | | 4/2018 | |
| JP | 2012087910 A | * | 5/2012 | |
| JP | 2021101122 A | * | 7/2021 | |
| WO | 2013047571 A1 | | 4/2013 | |

* cited by examiner

METHOD FOR TURNING OFF AN INTERNAL COMBUSTION ENGINE OF A VEHICLE POWERTRAIN SYSTEM AND A VEHICLE POWERTRAIN SYSTEM

RELATED APPLICATION DATA

This application is a continuation of International Patent Application No. PCT/CN2021/096799, filed May 28, 2021, which claims the benefit of European Patent Application No. 20179682.8, filed Jun. 12, 2020, the disclosures of which are incorporated herein by reference in their entireties.

TECHNICAL FIELD

The present disclosure relates to a method for turning off an internal combustion engine of a vehicle powertrain system, where the powertrain system comprises a transmission and a clutch arrangement. The clutch arrangement is connected to and arranged between the internal combustion engine and the transmission. The clutch arrangement comprises a first clutch arranged to couple the internal combustion engine to a first input shaft of the transmission and a second clutch arranged to couple the internal combustion engine to a second input shaft of the transmission. The first input shaft is drivingly connected to a first set of gears and the second input shaft is drivingly connected to a second set of gears. The first set of gears and the second set of gears are connected to an output shaft of the transmission. The disclosure further relates to a vehicle powertrain system comprising an internal combustion engine, a transmission, and a clutch arrangement; a non-transitory computer-readable medium; and a cloud computing system.

BACKGROUND

When turning off an internal combustion engine, existing engine stop strategies commonly uses a fuel cut where the fuel supply to the engine is interrupted. The engine turning off with fuel cut introduces issues with noise, vibration, and harshness, commonly called NVH, as well as extended engine stopping time, which can be disturbing to a user of the vehicle. Lower NVH is essential for a good powertrain design, and the reduction of NVH at any stage in the powertrain operation is improving the NVH experience for the user of the vehicle. Development measures for improving the NVH experience during the vehicle design process are often costly and time consuming, and are many times leading to increased vehicle prices. In certain markets, a high NVH experience with low levels of noise and vibrations in the vehicle is of utmost importance for attracting customers. Solutions for significantly improved NVH that can be implemented at a low cost is therefore highly desirable. One area that needs to be improved is when turning off the internal combustion engine, where a controlled engine stop with minimal vibrations and noise is desired. A reduction of engine stop noise will allow vehicle producers to reduce manufacturing costs in areas such as the flywheel, firewall and cabin insulation, as these components today are modified to a high degree for specific vehicle powertrains and vehicle body styles, adding reoccurring costs targeted at reducing engine NVH.

There is thus a need for an improved method for turning off an internal combustion engine of a vehicle powertrain system, and a vehicle powertrain system, where NVH is reduced to a high degree during engine stopping.

SUMMARY

An object of the present disclosure is to provide a method for turning off an internal combustion engine of a vehicle powertrain system, a vehicle powertrain system, a non-transitory computer-readable medium, and a cloud computing system, where the previously mentioned problems are avoided. This object is at least partly achieved by the features of the independent claims. The dependent claims contain further developments of the method for turning off the internal combustion engine, and further developments of the vehicle powertrain system.

The disclosure concerns a method for turning off an internal combustion engine of a vehicle powertrain system. The powertrain system further comprises a transmission and a clutch arrangement connected to and arranged between the internal combustion engine and the transmission. The clutch arrangement comprises a first clutch arranged to couple the internal combustion engine to a first input shaft of the transmission and a second clutch arranged to couple the internal combustion engine to a second input shaft of the transmission. The first input shaft is drivingly connected to a first set of gears and the second input shaft is drivingly connected to a second set of gears. The first set of gears and the second set of gears are connected to an output shaft of the transmission. The method comprises the steps: controlling the internal combustion engine in an idling state when the vehicle is in a standstill position, wherein the first clutch and the second clutch are arranged in open positions; engaging the first input shaft with a first pre-selected gear of the first set of gears, and engaging the second input shaft with a second pre-selected gear of the second set of gears; initiating an engine turning off command; stopping the internal combustion engine by at least partly closing the first clutch and the second clutch for simultaneously introducing torque transfer to the first clutch and the second clutch into a transmission tie-up state for a controlled engine stop, wherein engine inertia of the internal combustion engine is captured in the first clutch and the second clutch.

Advantages with these features are that a traditional internal combustion engine stop strategy, where an interrupted fuel supply to the engine leading to a high level of NVH, is not used. Instead, the closing of the clutches with the simultaneous torque transfer provides a controlled engine stop with highly reduced engine vibrations and engine noise, through the capturing of engine inertia of the internal combustion engine in the clutches. Further, with the method, the engine stopping time can be reduced, since the engine inertia efficiently is captured in the clutches. The reduced engine stopping time is improving the re-starting performance of the engine, for example, when the stop strategy is used in combination with an engine start-stop system, since a conventional 12 V starter motor normally requires the engine crankshaft to have fully stopped before performing a re-start of the engine. The method is providing a powertrain design with lower NVH, and the reduction of NVH during engine stopping to a high degree is improving the NVH experience for the user of the vehicle. The method could be implemented in the vehicle design process at a low cost if designing the powertrain system with suitable components. The low engine stop noise will allow for a reduction of manufacturing costs in areas such as the flywheel, firewall and cabin insulation, since these components do not need to be modified to the same degree for specific powertrain designs and vehicle body styles.

According to an aspect of the disclosure, when torque is simultaneously introduced to the first clutch and to the second clutch, a first torque level is transferred to the first clutch when the first input shaft is engaged to the first pre-selected gear and a second torque level is transferred to the second clutch when the second input shaft is engaged to the second pre-selected gear. The pre-selected gears are used for efficiently capture the engine inertia for a fast engine stopping operation. The captured inertia reduces the NVH, and contributes to an improved NVH experience for the user of the vehicle.

According to another aspect of the disclosure, the first torque level is dependent on a first gear ratio between the first pre-selected gear and the output shaft. The second torque level is dependent on a second gear ratio between the second pre-selected gear and the output shaft. To balance the torque levels, the gear ratios need to be taken into account to avoid any movement of the output shaft and vehicle wheels during the engine turning off operation.

According to an aspect of the disclosure, the first torque level and the second torque level are selected to counteract each other, preventing a rotational movement of the output shaft during stopping of the internal combustion engine. The counteracting torque levels are securing that the output shaft and the vehicle are not moving during the engine turning off operation. Suitable torque levels are determined during the powertrain system design process, and are dependent on the gear ratios used and other components of the transmission.

According to another aspect of the disclosure, the first clutch has a first rated instant capacity and the second clutch has a second rated instant capacity. Energy from the captured engine inertia in the first clutch is not exceeding the first rated instant capacity of the first clutch. Energy from the captured engine inertia in the second clutch is not exceeding the second rated instant capacity of the second clutch. To secure that the clutches used are optimal for the engine turning off operation, the rated instant capacities of the clutches are of high importance. During the engine turning off operation, the energy levels of the captured engine inertia should not exceed the rated instant capacities to secure that the clutches are not damaged. The engine stopping process therefore needs to be controlled with suitable energy levels. During the design process, the clutches used in the powertrain are selected to meet the energy demand during the engine turning off operation.

According to a further aspect of the disclosure, friction material in the first clutch and friction material in the second clutch are consuming energy from the captured engine inertia, where the consumed energy is converted into heat and transferred to transmission oil of the transmission.

According to an aspect of the disclosure, the powertrain system further comprises a control unit connected to the internal combustion engine, the transmission, and the clutch arrangement. The control unit is initiating the engine turning off command based upon an engine turning off request from a user of the vehicle or from an engine start-stop system. The control unit is efficiently controlling the engine turning off operation and the different components involved.

According to other aspects of the disclosure, the method further comprises the step: cutting off fuel supply to the internal combustion engine. The fuel supply to the internal combustion engine is cut off after closing of the first clutch and the second clutch for simultaneously introducing torque transfer to the first clutch and the second clutch into a controlled transmission tie-up state. This is allowing the engine first to be stopped through the controlled transmission tie-up procedure, and thereafter the fuel supply is turned off for increased safety.

The disclosure further concerns a vehicle powertrain system comprising an internal combustion engine, a transmission, and a clutch arrangement connected to and arranged between the internal combustion engine and the transmission. The clutch arrangement comprises a first clutch arranged to couple the internal combustion engine to a first input shaft of the transmission and a second clutch arranged to couple the internal combustion engine to a second input shaft of the transmission. The first input shaft is drivingly connected to a first set of gears and the second input shaft is drivingly connected to a second set of gears, where the first set of gears and the second set of gears are connected to an output shaft of the transmission. The internal combustion engine is configured to be controlled in an idling state when the vehicle is in a standstill position where the first clutch and the second clutch are arranged in open positions, and where the first input shaft is in engagement with a first pre-selected gear of the first set of gears and the second input shaft is in engagement with a second pre-selected gear of the second set of gears. The internal combustion engine is configured for being stopped by at least partly closing the first clutch and the second clutch for simultaneously introducing torque transfer to the first clutch and the second clutch into a transmission tie-up state for a controlled engine stop, where engine inertia of the internal combustion engine is captured in the first clutch and the second clutch.

Advantages with these features are that the closing of the clutches of the powertrain with the simultaneous torque transfer provides a controlled engine stop with highly reduced engine vibrations and engine noise, through the capturing of engine inertia of the internal combustion engine in the clutches. Further, with the method, the engine stopping time can be reduced, and the engine inertia is efficiently captured in the clutches. The reduced engine stopping time is improving the re-starting performance of the engine, since a conventional 12 V starter motor normally requires the engine crankshaft to have fully stopped before performing a re-start of the engine. The powertrain is through the design providing lower NVH, and the reduction of NVH during engine stopping to a high degree is improving the NVH experience for the user of the vehicle. The method could be implemented in the vehicle design process at a low cost if designing the powertrain system with suitable components.

According to an aspect of the disclosure, the transmission is configured with a first gear ratio between the first pre-selected gear and the output shaft, and a second gear ratio between the second pre-selected gear and the output shaft. To balance and counteract the torque levels, the gear ratios need to be taken into account to avoid any movement of the output shaft of the transmission during the engine turning off operation. The counteracting torque levels are securing that the output shaft and the vehicle are not moving during the engine turning off operation, and suitable torque levels are determined during the system design process, and are dependent on the gear ratios used and other components of the transmission.

According to another aspect of the disclosure, the first clutch comprises friction material and the second clutch comprises friction material. The friction material in the first clutch and the friction material in the second clutch are configured for consuming energy from the captured engine inertia, where the consumed energy is converted into heat and transferred to transmission oil of the transmission. The friction material is efficiently capturing the engine stopping inertia for a smooth turning off operation of the powertrain system.

According to a further aspect of the disclosure, the powertrain system further comprises a control unit connected to the internal combustion engine, the transmission, and the clutch arrangement. The control unit is configured for initiating the engine turning off command based upon an engine turning off request from a user of the vehicle or from an engine start-stop system. The control unit is efficiently controlling the engine turning off operation and the different components involved.

The disclosure further concerns a non-transitory computer-readable medium comprising instructions which, when executed by a computer, cause the computer to carry out the method; and a cloud computing system configured to carry out the method.

BRIEF DESCRIPTION OF THE DRAWINGS

The disclosure will be described in detail in the following, with reference to the attached drawings, in which.

DETAILED DESCRIPTION

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

Figure 1:
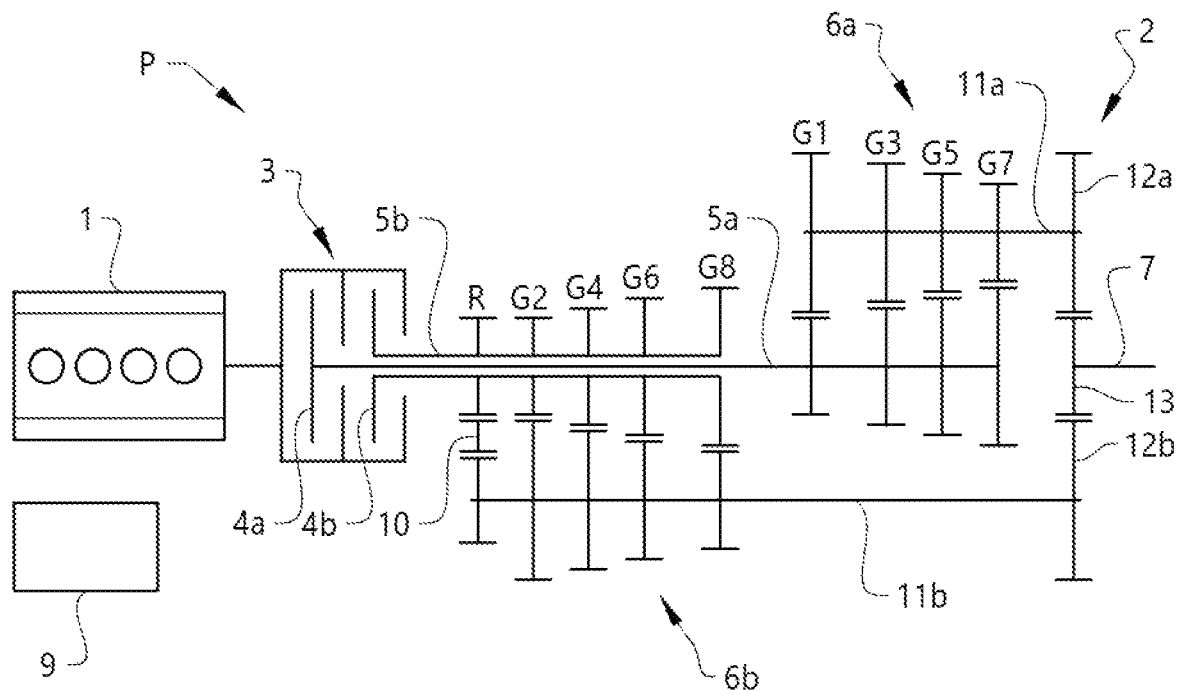
FIG. 1 shows schematically, an example layout of a vehicle powertrain system according to the disclosure.

FIG. 1 schematically shows an embodiment of a vehicle powertrain P according to the disclosure. The powertrain P comprises an internal combustion engine 1, a transmission 2, and a clutch arrangement 3. The transmission 2 and the clutch arrangement 3 are arranged as a dual clutch transmission, and in the illustrated embodiment, the DCT is configured with an eight-speed transmission layout having eight forward gears and a reverse gear. It should be understood that the DCT according to the disclosure could have any suitable configuration, design and number of gears, such as for example a seven-speed transmission with seven forward gears and a reverse gear or a six-speed transmission with six forward gears and a reverse gear.

As shown in FIG. 1, the clutch arrangement 3 is connected to and arranged between the internal combustion engine 1 and the transmission 2, and the clutch arrangement 3 has a dual clutch configuration. Any suitable dual clutch configuration may be used for the clutch arrangement 3. The transmission 2 connected to the clutch arrangement 3, may have any suitable configuration for supplying torque to driving wheels of the vehicle. Any suitable type of internal combustion engine 1 may be used in connection to the transmission 2 and the clutch arrangement 3.

In the embodiment illustrated in FIG. 1, the clutch arrangement 3 comprises a first clutch 4a arranged to couple the internal combustion engine 1 to a first input shaft 5a of the transmission 2. The first input shaft 5a is drivingly connected to a first set of gears 6a. The clutch arrangement 3 comprises a second clutch 4b arranged to couple the internal combustion engine 1 to a second input shaft 5b of the transmission 2. The second input shaft 5b is drivingly connected to a second set of gears 6b. The first set of gears 6a and the second set of gears 6b are connected to an output shaft 7 of the transmission 2. The first set of gears 6a and the second set of gears 6b are together providing the eight-speed transmission layout of the illustrated embodiment with eight different forward gears and a reverse gear. As schematically indicated in FIG. 1, the first set of gears 6a is configured with a first gear G1, a third gear G3, a fifth gear G5, and a seventh gear G7. Each of the first gear G1, the third gear G3, the fifth gear G5, and the seventh gear G7 comprises a pair of engaged gear wheels arranged on the first input shaft 5a and a first intermediate shaft 11a respectively. The second set of gears 6b is configured with a second gear G2, a fourth gear G4, a sixth gear G6, an eight gear G8, and a reverse gear R. Each of the second gear G2, the fourth gear G4, the sixth gear G6, and the eight gear G8 comprises a pair of engaged gear wheels arranged on the second input shaft 5b and a second intermediate shaft 11b respectively. The reverse gear R comprises a pair of cooperating gear wheels arranged on the second input shaft 5b and the second intermediate shaft 11b respectively with an intermediate idler gear 10 arranged in-between for reverse action. The first intermediate shaft 11a further comprises a first intermediate shaft gear wheel 12a connected to an output shaft gear wheel 13 arranged on the output shaft 7. The second intermediate shaft 11b further comprises a second intermediate shaft gear wheel 12b connected to the output shaft gear wheel 13 arranged on the output shaft 7.

In modern powertrain configurations, it is often desired to turn off the internal combustion engine when the vehicle is in a standstill position, for example at a traffic light or when being parked. The engine turning off operation may be requested and initiated by a user of the vehicle. Alternatively, the engine turning off operation may be requested and initiated by a vehicle system, where the vehicle system for example is an engine start-stop system. The engine turning off operation should be performed with as low noise and vibrations as possible for improving the NVH experience for the user of the vehicle, and with the shortest possible engine stopping time. The method for turning off the internal combustion engine 1 of the vehicle powertrain system P according to the disclosure is providing an efficient engine stopping process with the above stated requirements fulfilled. A control unit 9 is connected to the different components and systems of the vehicle powertrain system P, such as for example the internal combustion engine 1, the transmission 2, and the clutch arrangement 3, for controlling and steering the operation of the vehicle powertrain system P.

To turn off the internal combustion engine 1, the internal combustion engine 1 should be in an idling state. In the idling state, the vehicle is arranged in a standstill position, such as parked at a parking spot or stopped at a traffic light.

When idling, there is no torque transfer from the internal combustion engine 1 to the transmission 3 via the clutch arrangement 3, and the first clutch 4a and the second clutch 4b are arranged in open positions. When the vehicle is in the standstill position, the internal combustion engine 1 is controlled by the control unit 9 into the idling state, where the first clutch 4a and the second clutch 4b are arranged in open positions.

Figure 2:
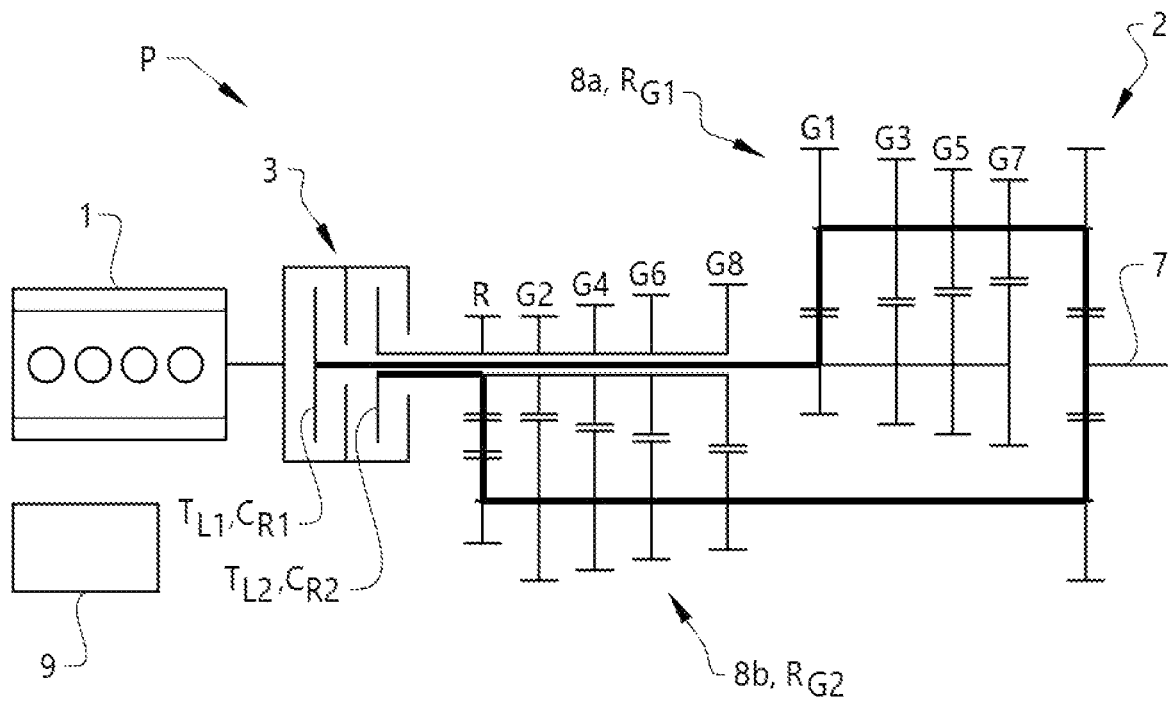
FIG. 2 shows schematically, the layout of the vehicle powertrain system with engaged input shafts and pre-selected gears according to the disclosure.

When the internal combustion engine 1 is in the idling state, the first input shaft 5a is engaged with a first pre-selected gear 8a of the first set of gears 6a, and the second input shaft 5b is engaged with a second pre-selected gear 8b of the second set of gears 6b. The control unit 9 is controlling the engagement of the respective pre-selected gears. The engagement of the first input shaft 5a with the first pre-selected gear 8a is schematically illustrated in FIG. 2, where the first gear G1 of the first set of gears 6a is chosen as the first pre-selected gear 8a. The engagement of the second input shaft 5b with the second pre-selected gear 8b is schematically illustrated in FIG. 2, where the reverse gear R of the second set of gears 6b is chosen as the second pre-selected gear 8b. It should be understood that any of the first gear G1, the third gear G3, the fifth gear G5, and the seventh gear G7, of the first set of gears 6a could be used as the first pre-selected gear 8a, which may depend on the design and configuration of the vehicle powertrain system P. In the same way, any of the second gear G2, the fourth gear G4, the sixth gear G6, the eight gear G8, and the reverse gear R, of the second set of gears 6b could be used as the second pre-selected gear 8b, which may depend on the design and configuration of the vehicle powertrain system P. Engaging gears in opposite directions, such as for example the first gear G1 of the first set of gears 6a and the reverse gear R of the second set of gears 6b, is suitable for minimal NVH during the engine turning off operation and for minimized torque impact on the driven wheels when stopping the engine, as schematically illustrated in FIG. 2.

When the respective pre-selected gears have been engaged in the idling state, the powertrain system 1 is ready to receive an engine turning off command. The engine turning off command may also be received before the respective pre-selected gears have been engaged in the idling state, as an alternative. The engine turning off command is requested by the user of the vehicle or by the engine start-stop system. The user of the vehicle may for example push an engine stop button or similar switch arrangement for requesting the engine turning off command. The engine turning off command is thereafter initiated by the control unit 9, based upon the engine turning off request from the user or the engine start-stop system. Before initiating the engine turning off command, wheel friction brakes may be applied and monitored by the control unit 9 for added comfort and safety during the engine turning off operation, especially if any of the forward gears G1, G3, G5, G7 of the first set of gears 6a are used in combination with any of the forward gears G2, G4, G5, G6 of the second set of gears 6b.

When the control unit 9 is initiating the engine turning off command, the internal combustion engine 1 is stopped by at least partly closing the first clutch 4a and the second clutch 4b for simultaneously introducing torque transfer to the first clutch 4a and the second clutch 4b into a transmission tie-up state for a controlled engine stop. The torque transfer flow is schematically illustrated in FIG. 2. In the tie-up state, engine inertia of the internal combustion engine 1 is captured in the first clutch 4a and the second clutch 4b, and the rotational movement of the internal combustion engine 1 in the idling state is stopped through the capturing of the engine inertia in the respective clutches.

Since the gears of the transmission 2 are pre-selected on both input shafts during normal control strategies of the DCT, this is used by the vehicle powertrain system 1 also when the internal combustion engine 1 is being turned off. The introduced torque transfer to both clutches will inherently result in an increased drag force, which is affecting the turn-off rate of the internal combustion engine 1. By capturing the engine inertia in the clutches, energy that would otherwise be converted into noise and vibrations will be consumed by friction material in the first clutch 4a and friction material in the second clutch 4b. The consumed energy in the friction material of the respective clutches is converted to heat and transferred to the oil of the transmission.

The closing of the clutches with the simultaneous torque transfer thus provides a controlled engine stop with highly reduced engine vibrations and engine noise, through the capturing of engine inertia of the internal combustion engine 1 in the respective clutches. Further, the engine stopping time is reduced with the increased drag force, since the engine inertia is efficiently captured in the clutches. The method is providing a powertrain design with lower NVH, and the reduction of NVH during engine stopping to a high degree is improving the NVH experience for the user of the vehicle. The method could be implemented in the vehicle design process at a low cost if designing the powertrain system with suitable components. The low engine stop noise will allow for a reduction of manufacturing costs in areas such as the flywheel, firewall and cabin insulation, since these components do not need to be modified to the same degree for specific powertrains and body styles. The solution is providing a controlled stop of the internal combustion engine 1 using the transmission 2, by inducing the controlled clutch tie-up for improved NVH comfort when stopping the internal combustion engine 1.

When torque is simultaneously introduced to the first clutch 4a and to the second clutch 4b, a first torque level $T_{L1}$ is transferred to the first clutch 4a when the first input shaft 5a is engaged to the first pre-selected gear 8a. When torque is simultaneously introduced to the first clutch 4a and to the second clutch 4b, a second torque level $T_{L2}$ is transferred to the second clutch 4b when the second input shaft 5b is engaged to the second pre-selected gear 8b. The torque levels are suitable chosen to meet the stopping requirements of the internal combustion engine 1. The first torque level $T_{L1}$ is dependent on a first gear ratio $R_{G1}$ between the first pre-selected gear 8a and the output shaft 7, and the second torque level $T_{L2}$ is dependent on a second gear ratio $R_{G2}$ between the second pre-selected gear 8b and the output shaft 7. In the embodiment illustrated in FIG. 2, the first torque level $T_{L1}$ is dependent on the gear ratio of the selected first gear G1, and the second torque level $T_{L2}$ is dependent on the gear ratio of the selected reverse gear R. In order to achieve the engine turning off with low vibrations and noise, the first torque level $T_{L1}$ and the second torque level $T_{L2}$ are selected to counteract each other. The selection of counteracting torque levels is preventing a rotational movement of the output shaft 7 during stopping of the internal combustion engine 1. The counteracting torque levels are thus securing that the output shaft 7 and the vehicle are not moving during the engine turning off operation. Suitable torque levels are determined during the system design process, and are as described above dependent on the gear ratios used and other components of the transmission. The transmission 2 is thus configured with the first gear ratio $R_{G1}$ between the first pre-selected gear 8a and the output shaft 7, and the second gear ratio $R_{G2}$ between the second pre-selected gear 8b and the output shaft 7.

When designing the vehicle powertrain system P, the clutches are selected to manage the capturing of energy during the engine turning off procedure. Normally, idling internal combustion engines have low inertia, and the amount of energy captured should not exceed that of the rated instant capacity of the clutches. By selecting suitable clutches, minimal wear is to be expected from the engine turning off operation, even if used frequently. According to the disclosure, the first clutch 4a has a first rated instant capacity $C_{R1}$ and the second clutch 4b has a second rated instant capacity $C_{R2}$. During the engine turning off operation, it is secured that energy from the captured engine inertia in the first clutch 4a is not exceeding the first rated instant capacity $C_{R1}$ of the first clutch 4a, and that energy from the captured engine inertia in the second clutch 4b is not exceeding the second rated instant capacity $C_{R2}$ of the second clutch 4b. This could for example be accomplished by selecting suitable torque levels applied to the respective clutches, and controlled by the control unit 9.

Figure 3:
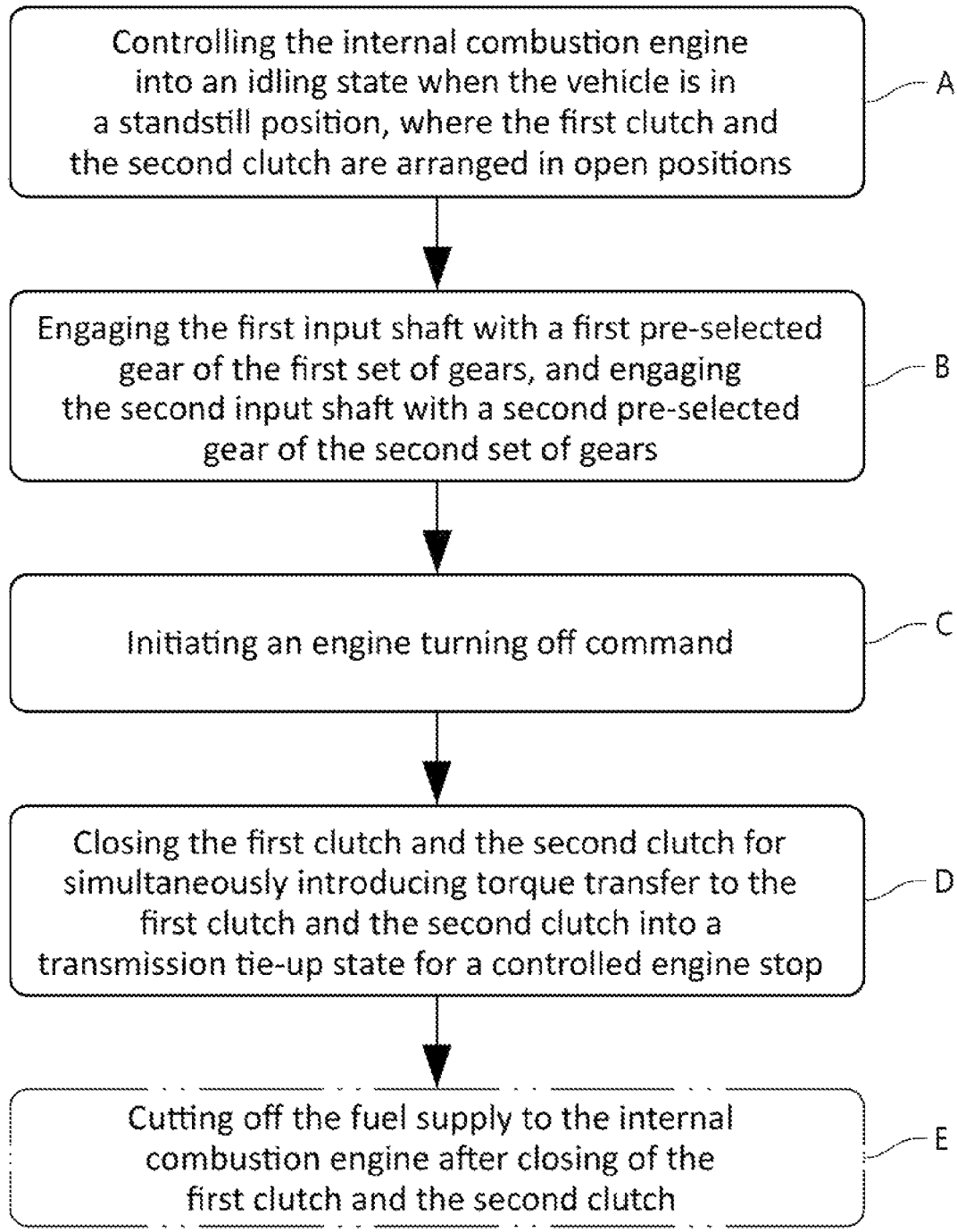
FIG. 3 shows schematically a flowchart of exemplified method steps for turning off an internal combustion engine of the vehicle powertrain system according to the disclosure.

For increased safety, the fuel supply to the internal combustion engine 1 may be cut off. Suitably, the fuel supply to the internal combustion engine 1 is cut off after closing of the first clutch 4a and the second clutch 4b for simultaneously introducing torque transfer to the first clutch 4a and the second clutch 4b into the controlled transmission tie-up state. This procedure is allowing the internal combustion engine 1 first to be stopped through the controlled transmission tie-up procedure, and thereafter the fuel supply is turned off A flowchart of an exemplified method for turning off the internal combustion engine 1 is shown in FIG. 3. The exemplified method comprises the steps described below with reference to FIG. 3.

The vehicle powertrain system 1 may have the configuration illustrated in FIGS. 1-2 in the exemplified method, where the vehicle powertrain system P comprises the internal combustion engine 1, the transmission 2, and the clutch arrangement 3 connected to and arranged between the internal combustion engine 1 and the transmission 2. The clutch arrangement 3 comprises the first clutch 4a arranged to couple the internal combustion engine 1 to the first input shaft 5a of the transmission 2, and the second clutch 4b arranged to couple the internal combustion engine 1 to the second input shaft 5b of the transmission 2. The first input shaft 5a is drivingly connected to the first set of gears 6a and the second input shaft 5b is drivingly connected to the second set of gears 6b, and the first set of gears 6a and the second set of gears 6b are connected to the output shaft 7 of the transmission 2.

In step A, the internal combustion engine 1 is controlled into an idling state when the vehicle is in a standstill position by the control unit 9. In the idling state, the first clutch 4a and the second clutch 4b are arranged in open positions.

In step B, the first input shaft 5a is engaged with a first pre-selected gear 8a of the first set of gears 6a, and the second input shaft 5b is engaged with a second pre-selected gear 8b of the second set of gears 6b.

In step C, an engine turning off command is initiated. The engine turning off command can be initiated by the user of the vehicle or by the engine start-stop system.

In step D, the internal combustion engine 1 is stopped by at least partly closing the first clutch 4a and the second clutch 4b for simultaneously introducing torque transfer to the first clutch 4a and the second clutch 4b into a transmission tie-up state for a controlled engine stop. Engine inertia of the internal combustion engine 1 is captured in the first clutch 4a and the second clutch 4b.

When torque is simultaneously introduced to the first clutch 4a and to the second clutch 4b in step D, the first torque level $T_{L1}$ is transferred to the first clutch 4a when the first input shaft 5a is engaged to the first pre-selected gear 8a and a second torque level $T_{L2}$ is transferred to the second clutch 4b when the second input shaft 5b is engaged to the second pre-selected gear 8b. The first torque level $T_{L1}$ is dependent on the first gear ratio $R_{G1}$, and the second torque level $T_{L2}$ is dependent on the second gear ratio $R_{G2}$, as described above.

In some embodiments, the method for turning off the internal combustion engine 1 further comprises the following step:

In step E, the fuel supply to the internal combustion engine 1 is cut off after closing of the first clutch 4a and the second clutch 4b for simultaneously introducing torque transfer to the first clutch 4a and the second clutch 4b into the controlled transmission tie-up state.

The disclosure further concerns a non-transitory computer-readable medium comprising instructions which, when executed by a computer, cause the computer to carry out the method according to the method; and a cloud computing system configured to carry out the method.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of the powertrain system, the one or more programs comprising instructions for performing the method according to any one of the above-discussed embodiments. Alternatively, according to another exemplary embodiment a cloud computing system can be configured to perform any of the method aspects presented herein. The cloud computing system may comprise distributed cloud computing resources that jointly perform the method aspects presented herein under control of one or more computer program products. Moreover, the processor may be connected to one or more communication interfaces and/or sensor interfaces for receiving and/transmitting data with external entities such as e.g. sensors arranged on the vehicle surface, an off-site server, or a cloud-based server.

The processor or processors associated with the powertrain system may be or include any number of hardware components for conducting data or signal processing or for executing computer code stored in memory. The system may have an associated memory, and the memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure or the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1: Internal combustion engine
2: Transmission
3: Clutch arrangement
4a: First clutch
4b: Second clutch
5a: First input shaft
5b: Second input shaft
6a: First set of gears
6b: Second set of gears
7: Output shaft
8a: First pre-selected gear
8b: Second pre-selected gear
9: Control unit
10: Idler gear
11a: First intermediate shaft
11b: Second intermediate shaft
12a: First intermediate shaft gear wheel
12b: Second intermediate shaft gear wheel
13: Output shaft gear wheel
$C_{R1}$: First rated instant capacity
$C_{R2}$: Second rated instant capacity
G1: First gear
G2: Second gear
G3: Third gear
G4: Fourth gear
G5: Fifth gear
G6: Sixth gear
G7: Seventh gear
G8: Eight gear
P: Vehicle powertrain system
R: Reverse gear
$R_{G1}$: First gear ratio
$R_{G2}$: Second gear ratio
$T_{L1}$: First torque level
$T_{L2}$: Second torque level

What is claimed is:

1. A method for turning off an internal combustion engine of a vehicle powertrain system, wherein the powertrain system further comprises a transmission and a clutch arrangement connected to and arranged between the internal combustion engine and the transmission, wherein the clutch arrangement comprises a first clutch arranged to couple the internal combustion engine to a first input shaft of the transmission and a second clutch arranged to couple the internal combustion engine to a second input shaft of the transmission, wherein the first input shaft is drivingly connected to a first set of gears and the second input shaft is drivingly connected to a second set of gears, wherein the first set of gears and the second set of gears are connected to an output shaft of the transmission, wherein the method comprises the steps:

controlling the internal combustion engine in an idling state when the vehicle is in a standstill position, wherein the first clutch and the second clutch are arranged in open positions;
engaging the first input shaft with a first pre-selected gear of the first set of gears, and engaging the second input shaft with a second pre-selected gear of the second set of gears;
initiating an engine turning off command;
stopping the internal combustion engine by at least partly closing the first clutch and the second clutch for simultaneously introducing torque transfer to the first clutch and the second clutch into a transmission tie-up state for a controlled engine stop, wherein engine inertia of the internal combustion engine is captured in the first clutch and the second clutch; and
cutting off fuel supply to the internal combustion engine, wherein the fuel supply to the internal combustion engine is cut off after closing of the first clutch and the second clutch for simultaneously introducing torque transfer to the first clutch and the second clutch into the controlled transmission tie-up state.

2. The method according to claim 1, wherein when torque is simultaneously introduced to the first clutch and to the second clutch a first torque level is transferred to the first clutch when the first input shaft is engaged to the first pre-selected gear and a second torque level is transferred to the second clutch when the second input shaft is engaged to the second pre-selected gear.

3. The method according to claim 2, wherein the first torque level is dependent on a first gear ratio between the first pre-selected gear and the output shaft, and wherein the second torque level is dependent on a second gear ratio between the second pre-selected gear and the output shaft.

4. The method according to claim 3, wherein the first torque level and the second torque level are selected to counteract each other, preventing a rotational movement of the output shaft during stopping of the internal combustion engine.

5. The method according to claim 1, wherein the first clutch has a first rated instant capacity and the second clutch has a second rated instant capacity, wherein energy from the captured engine inertia in the first clutch is not exceeding the first rated instant capacity of the first clutch, and wherein energy from the captured engine inertia in the second clutch is not exceeding the second rated instant capacity of the second clutch.

6. The method according to claim 1, wherein friction material in the first clutch and friction material in the second clutch are consuming energy from the captured engine inertia, wherein the consumed energy is converted into heat and transferred to transmission oil of the transmission.

7. The method according to claim 1, wherein the powertrain system further comprises a control unit connected to the internal combustion engine, the transmission, and the clutch arrangement, wherein the control unit is initiating the engine turning off command based upon an engine turning off request from a user of the vehicle or from an engine start-stop system.

8. A non-transitory computer-readable medium storing a computer program comprising instructions which, when executed by a computer, cause the computer to carry out the method according to claim 1.

9. A method for turning off an internal combustion engine of a vehicle powertrain system, wherein the powertrain system further comprises a transmission and a clutch arrangement connected to and arranged between the internal combustion engine and the transmission, wherein the clutch arrangement comprises a first clutch arranged to couple the internal combustion engine to a first input shaft of the transmission and a second clutch arranged to couple the internal combustion engine to a second input shaft of the transmission, wherein the first input shaft is drivingly connected to a first set of gears and the second input shaft is drivingly connected to a second set of gears, wherein the first set of gears and the second set of gears are connected to an output shaft of the transmission, wherein the method comprises the steps:
controlling the internal combustion engine in an idling state when the vehicle is in a standstill position, wherein the first clutch and the second clutch are arranged in open positions;
engaging the first input shaft with a first pre-selected gear of the first set of gears, and engaging the second input shaft with a second pre-selected gear of the second set of gears;
initiating an engine turning off command; and
stopping the internal combustion engine by at least partly closing the first clutch and the second clutch for simultaneously introducing torque transfer to the first clutch and the second clutch into a transmission tie-up state for a controlled engine stop, wherein engine inertia of the internal combustion engine is captured in the first clutch and the second clutch,
wherein when torque is simultaneously introduced to the first clutch and to the second clutch a first torque level is transferred to the first clutch when the first input shaft is engaged to the first pre-selected gear and a second torque level is transferred to the second clutch when the second input shaft is engaged to the second pre-selected gear, the first torque level is dependent on a first gear ratio between the first pre-selected gear and the output shaft, and the second torque level is dependent on a second gear ratio between the second pre-selected gear and the output shaft.

10. The method according to claim 9, wherein the first torque level and the second torque level are selected to counteract each other, preventing a rotational movement of the output shaft during stopping of the internal combustion engine.

11. The method according to claim 9, wherein the first clutch has a first rated instant capacity and the second clutch has a second rated instant capacity, wherein energy from the captured engine inertia in the first clutch is not exceeding the first rated instant capacity of the first clutch, and wherein energy from the captured engine inertia in the second clutch is not exceeding the second rated instant capacity of the second clutch.

12. The method according to claim 9, wherein friction material in the first clutch and friction material in the second clutch are consuming energy from the captured engine inertia, wherein the consumed energy is converted into heat and transferred to transmission oil of the transmission.

13. The method according to claim 9, wherein the powertrain system further comprises a control unit connected to the internal combustion engine, the transmission, and the clutch arrangement, wherein the control unit is initiating the engine turning off command based upon an engine turning off request from a user of the vehicle or from an engine start-stop system.

14. The method according to claim 9, wherein the method further comprises the step: cutting off fuel supply to the internal combustion engine.

15. A method for turning off an internal combustion engine of a vehicle powertrain system, wherein the powertrain system further comprises a transmission and a clutch arrangement connected to and arranged between the internal combustion engine and the transmission, wherein the clutch arrangement comprises a first clutch arranged to couple the internal combustion engine to a first input shaft of the transmission and a second clutch arranged to couple the internal combustion engine to a second input shaft of the transmission, wherein the first input shaft is drivingly connected to a first set of gears and the second input shaft is drivingly connected to a second set of gears, wherein the first set of gears and the second set of gears are connected to an output shaft of the transmission, wherein the method comprises the steps:
controlling the internal combustion engine in an idling state when the vehicle is in a standstill position, wherein the first clutch and the second clutch are arranged in open positions;
engaging the first input shaft with a first pre-selected gear of the first set of gears, and engaging the second input shaft with a second pre-selected gear of the second set of gears;
initiating an engine turning off command; and
stopping the internal combustion engine by at least partly closing the first clutch and the second clutch for simultaneously introducing torque transfer to the first clutch and the second clutch into a transmission tie-up state for a controlled engine stop, wherein engine inertia of the internal combustion engine is captured in the first clutch and the second clutch,
wherein the first clutch has a first rated instant capacity and the second clutch has a second rated instant capacity, wherein energy from the captured engine inertia in the first clutch is not exceeding the first rated instant capacity of the first clutch, and wherein energy from the captured engine inertia in the second clutch is not exceeding the second rated instant capacity of the second clutch.

16. The method according to claim 15, wherein when torque is simultaneously introduced to the first clutch and to the second clutch a first torque level is transferred to the first clutch when the first input shaft is engaged to the first pre-selected gear and a second torque level is transferred to the second clutch when the second input shaft is engaged to the second pre-selected gear.

17. The method according to claim 16, wherein the first torque level is dependent on a first gear ratio between the first pre-selected gear and the output shaft, and wherein the second torque level is dependent on a second gear ratio between the second pre-selected gear and the output shaft, the first torque level and the second torque level are selected to counteract each other, preventing a rotational movement of the output shaft during stopping of the internal combustion engine.

18. The method according to claim 15, wherein friction material in the first clutch and friction material in the second clutch are consuming energy from the captured engine inertia, wherein the consumed energy is converted into heat and transferred to transmission oil of the transmission.

19. The method according to claim 15, wherein the powertrain system further comprises a control unit connected to the internal combustion engine, the transmission, and the clutch arrangement, wherein the control unit is initiating the engine turning off command based upon an engine turning off request from a user of the vehicle or from an engine start-stop system.

20. The method according to claim 15, wherein the method further comprises the step: cutting off fuel supply to the internal combustion engine.

\* \* \* \* \*